(12) United States Patent
Nagasawa et al.

(10) Patent No.: US 10,899,891 B2
(45) Date of Patent: Jan. 26, 2021

(54) REACTIVE POLYSILOXANE AND POLYMERIZABLE COMPOSITION COMPRISING SAME

(71) Applicant: NISSAN CHEMICAL CORPORATION, Tokyo (JP)

(72) Inventors: Takehiro Nagasawa, Funabashi (JP); Taku Kato, Funabashi (JP); Keisuke Shuto, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 70 days.

(21) Appl. No.: 16/306,519

(22) PCT Filed: May 24, 2017

(86) PCT No.: PCT/JP2017/019392
§ 371 (c)(1),
(2) Date: Nov. 30, 2018

(87) PCT Pub. No.: WO2017/208936
PCT Pub. Date: Dec. 7, 2017

(65) Prior Publication Data
US 2019/0256664 A1    Aug. 22, 2019

(30) Foreign Application Priority Data

May 30, 2016   (JP) ................................ 2016-107984

(51) Int. Cl.
*C08G 77/20* (2006.01)
*C08G 77/442* (2006.01)
(Continued)

(52) U.S. Cl.
CPC .............. *C08G 77/442* (2013.01); *C08F 2/48* (2013.01); *C08F 230/08* (2013.01);
(Continued)

(58) Field of Classification Search
None
See application file for complete search history.

(56) References Cited

U.S. PATENT DOCUMENTS 3,427,273 A * 2/1969 Newing, Jr. ............ C09K 11/06
524/806
6,949,616 B2 * 9/2005 Jacob ..................... B01D 71/70
524/588

(Continued)

FOREIGN PATENT DOCUMENTS

JP     H04-273250 A    9/1992
JP     2010-097194 A   4/2010

(Continued)

OTHER PUBLICATIONS

Aug. 1, 2017 International Search Report issued in International Patent Application No. PCT/JP2017/019392.

(Continued)

*Primary Examiner* — Robert S Loewe
(74) *Attorney, Agent, or Firm* — Oliff PLC

(57) ABSTRACT

A polymerizable composition includes 100 parts by mass of a reactive polysiloxane being a polycondensation product of an alkoxy silicon compound including at least an alkoxy silicon compound of formula [1], and 10 to 500 parts by mass of a polymerizable compound having at least one polymerizable double bond.

$$X-\underset{\underset{OR^1)_2}{|}}{Si}-Ar^1 \quad [1]$$

(X is a phenyl group having at least one substituent having a polymerizable double bond, a naphthyl group having at (Continued)

least one substituent having a polymerizable double bond, a biphenyl group having at least one substituent having a polymerizable double bond, or a phenanthryl group having at least one substituent having a polymerizable double bond, $Ar^1$ is a condensed ring hydrocarbon group having two or more benzene ring structures, or a hydrocarbon ring assembly group in which two or more aromatic rings are directly bonded through a single bond, and $R^1$ is methyl group, ethyl group, or isopropyl group).

15 Claims, 2 Drawing Sheets

(51) Int. Cl.
| | |
|---|---|
| *G02B 1/04* | (2006.01) |
| *C08F 2/48* | (2006.01) |
| *C08F 230/08* | (2006.01) |
| *C08F 290/06* | (2006.01) |
| *B29C 35/08* | (2006.01) |
| *B29K 83/00* | (2006.01) |
| *B29K 105/00* | (2006.01) |
| *B29L 11/00* | (2006.01) |
| *C08G 77/00* | (2006.01) |

(52) U.S. Cl.
CPC ............ *C08F 290/06* (2013.01); *C08G 77/20* (2013.01); *G02B 1/04* (2013.01); *G02B 1/041* (2013.01); *B29C 35/0805* (2013.01); *B29C 2035/0827* (2013.01); *B29K 2083/00* (2013.01); *B29K 2105/0002* (2013.01); *B29L 2011/0016* (2013.01); *C08G 77/80* (2013.01)

(56) References Cited

U.S. PATENT DOCUMENTS

| | | | | |
|---|---|---|---|---|
| 6,984,747 | B2* | 1/2006 | Jacob | C07F 7/1876 556/466 |
| 9,012,673 | B1* | 4/2015 | Mabry | C08G 77/045 556/461 |
| 2003/0216537 | A1* | 11/2003 | Friedrich | C08G 77/04 528/24 |
| 2003/0232951 | A1* | 12/2003 | Friedrich | C07F 7/21 528/32 |
| 2005/0032357 | A1* | 2/2005 | Rantala | H01L 21/02126 438/637 |
| 2005/0244658 | A1* | 11/2005 | Bae | C08G 77/14 428/447 |
| 2007/0225466 | A1* | 9/2007 | Matsumoto | C08L 83/14 528/25 |
| 2009/0246716 | A1* | 10/2009 | Kathaperumal | G03F 7/0005 430/325 |
| 2010/0019399 | A1* | 1/2010 | Kimura | C08F 283/12 257/791 |
| 2010/0123259 | A1* | 5/2010 | Yorisue | C08F 283/12 257/791 |
| 2010/0209669 | A1* | 8/2010 | Aoai | C08F 283/122 428/156 |
| 2011/0207049 | A1* | 8/2011 | Tillema | C08G 77/14 430/270.1 |
| 2011/0230584 | A1* | 9/2011 | Araki | C08F 290/148 522/99 |
| 2014/0051821 | A1* | 2/2014 | Popall | C08G 77/20 528/26 |
| 2015/0252221 | A1* | 9/2015 | Iimura | C09D 183/04 524/588 |
| 2015/0344636 | A1* | 12/2015 | Iimura | C08G 77/14 257/791 |
| 2016/0252816 | A1* | 9/2016 | Mikami | B29D 11/00663 430/321 |
| 2018/0079849 | A1* | 3/2018 | Nagasawa | C08F 2/44 |
| 2018/0305488 | A1 | 10/2018 | Nagasawa et al. | |

FOREIGN PATENT DOCUMENTS

| | | |
|---|---|---|
| JP | 2015-025075 A | 2/2015 |
| JP | WO2017-208748 A1 | 4/2019 |
| WO | 2015/129818 A1 | 9/2015 |
| WO | 2015/159972 A1 | 10/2015 |
| WO | WO2017/069262 A1 | 10/2017 |

OTHER PUBLICATIONS

Aug. 1, 2017 Written Opinion of the International Searching Authority issued in International Patent Application No. PCT/JP2017/019392.
Translation of Jul. 1, 2020 Office Action issued in Japanese Patent Application No. 2018-520840.
Sep. 23, 2020 Office Action issued in Chinese Patent Application No. 201780033323.2.

* cited by examiner

[Fig. 1]
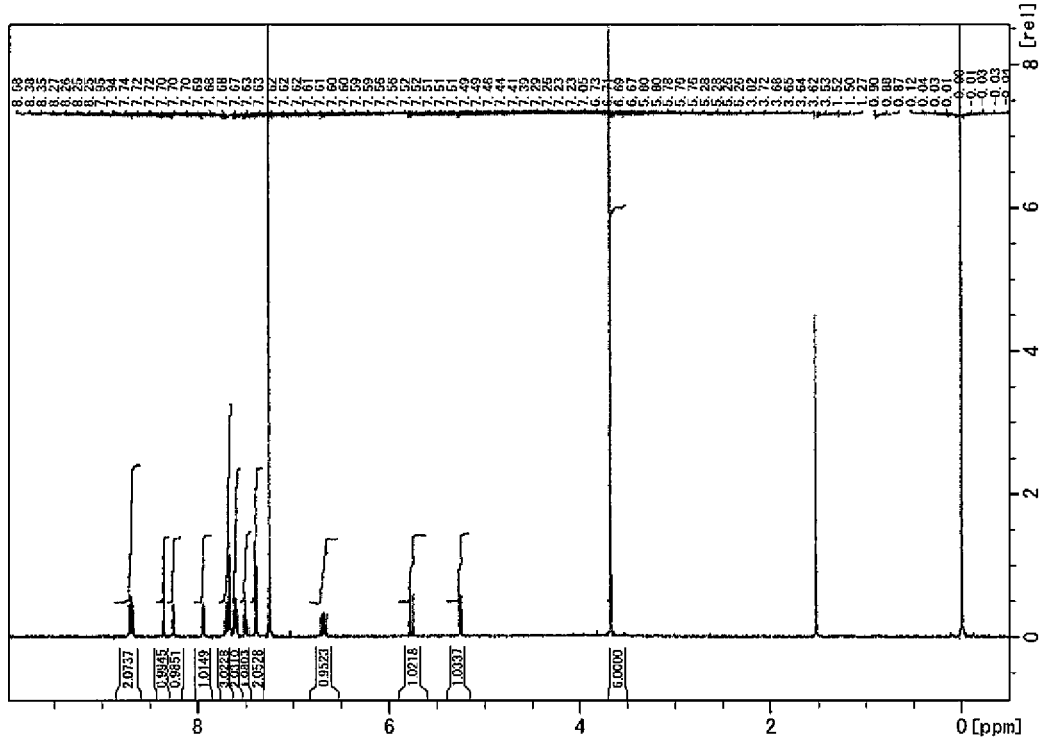
[Fig. 2]
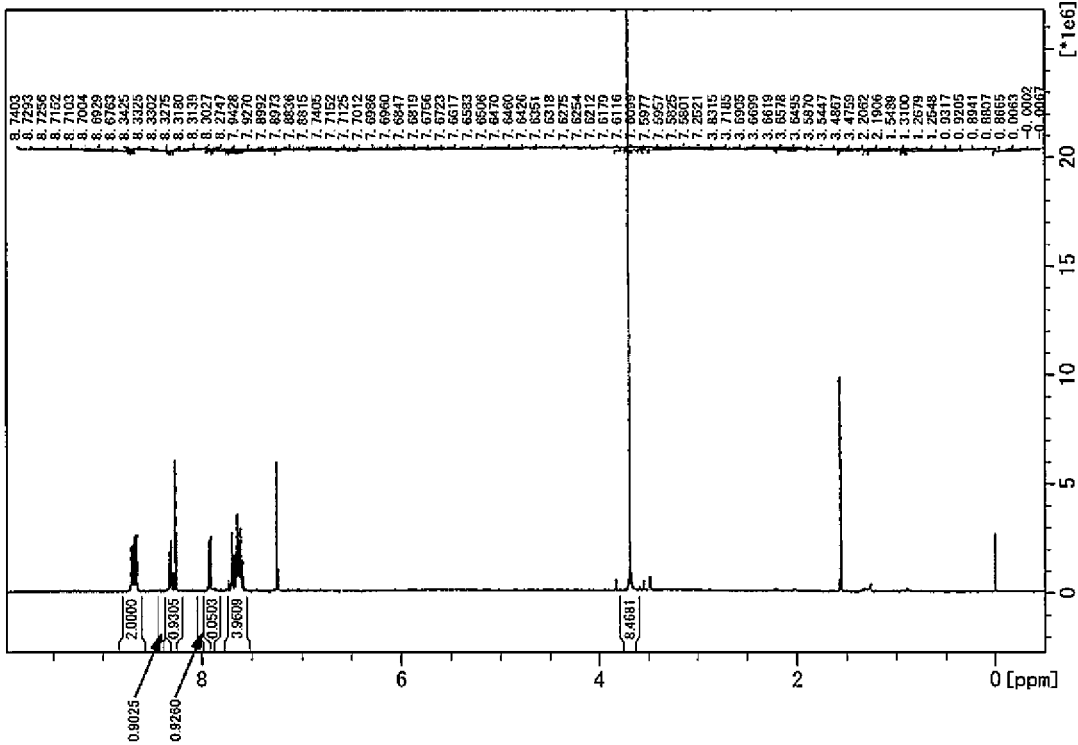

[Fig. 3]
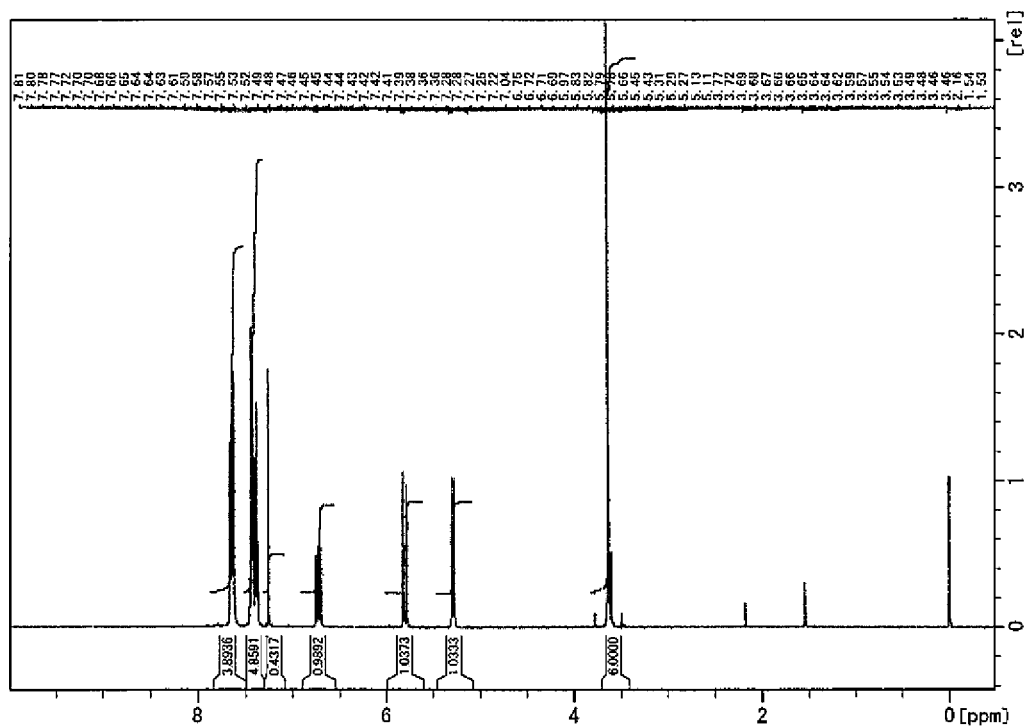

REACTIVE POLYSILOXANE AND POLYMERIZABLE COMPOSITION COMPRISING SAME

TECHNICAL FIELD

The present invention relates to a polymerizable composition comprising a reactive polysiloxane. Specifically, the present invention relates to a polymerizable composition that can form a cured product having excellent optical properties (transparency, low Abbe number, and high refractive index) and high heat resistance (crack resistance, dimensional stability, etc.).

BACKGROUND ART

Resin lenses are used in electronic devices such as mobile phones, digital cameras, and vehicle-mounted cameras and required to have excellent optical properties according to the purpose of each electronic device. The resin lenses are also required to have high durability, for example, heat resistance and weather resistance, and productivity that permits molding at high yields, according to the mode of use. For example, thermoplastic transparent resins such as polycarbonate resins, cycloolefin polymers, and methacrylic resins have been employed as materials for resin lenses that satisfy these requirements.

A plurality of lenses are used in high-resolution camera modules. Among these lenses, one wavelength correction lens is required to be made of an optical material having high wavelength dispersing properties, i.e., a low Abbe number. For the production of resin lenses, a shift from the injection molding of thermoplastic resins to molding at the wafer level by compression molding using curable resins that are liquid at room temperature has been actively studied in order to improve yields or production efficiency and furthermore, suppress optical axis displacement at the time of lens lamination.

A composition containing an organic sulfur compound (see, for example, Patent Document 1) and an organic-inorganic complex with titanium oxide are known as conventional materials characterized by a low Abbe number. However, problems of the former material are odor derived from free sulfur and a low light transmittance of a cured product (molded article) ascribable to coloring, while problems of the latter material are white turbidity ascribable to the aggregation of inorganic fine particles and a fragile cured product. Thus, these materials are difficult to apply to actual processes.

PRIOR ART DOCUMENTS

Patent Document

Patent Document 1: Japanese Patent Application Publication No. 2010-97194 (JP 2010-97194 A)

SUMMARY OF THE INVENTION

Problem to be Solved by the Invention

Accordingly, there has not yet been any curable resin material that can be used as a lens for high-resolution camera modules, has a low Abbe number (e.g., 23 or less), and satisfies high transparency. Thus, the development thereof has been demanded.

The present invention has been made in light of these circumstances. An object of the present invention is to provide a polymerizable composition that yields a cured product exhibiting a low Abbe number and is suitable for preparing a molded article having higher transparency.

Means for Solving the Problem

The present inventors have conducted diligent studies to attain the object and consequently completed the present invention by finding that a polymerizable composition supplemented with a specific reactive polysiloxane compound exerts a low Abbe number (e.g., 23 or less) and a high refractive index (e.g., 1.62 or more) and exhibits high transparency of 70% or more in the resulting cured product (molded article) thereof, and can suppress change in the dimension of the molded article caused by high-temperature heat history.

Specifically, in the first aspect, the present invention relates to a polymerizable composition comprising 100 parts by mass of (a) a reactive polysiloxane being a polycondensation product of an alkoxy silicon compound comprising at least an alkoxy silicon compound A of formula [1], and 10 to 500 parts by mass of (b) a polymerizable compound having at least one polymerizable double bond:

[1]

(wherein X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^1$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^1$ is methyl group, ethyl group, or isopropyl group).

In the second aspect, the present invention relates to the polymerizable composition according to the first aspect, wherein the X is vinylphenyl group.

In the third aspect, the present invention relates to the polymerizable composition according to the first or second aspect, wherein the $Ar^1$ is condensed ring hydrocarbon group having two or more benzene ring structures.

In the fourth aspect, the present invention relates to the polymerizable composition according to the third aspect, wherein the $Ar^1$ is phenanthryl group.

In the fifth aspect, the present invention relates to the polymerizable composition according to any one of the first to fourth aspects, wherein the alkoxy silicon compound further comprises alkoxy silicon compound B of formula [2]:

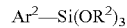 [2]

(wherein $Ar^2$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^2$ is methyl group, ethyl group, or isopropyl group).

In the sixth aspect, the present invention relates to the polymerizable composition according to the fifth aspect, wherein the $Ar^2$ is phenanthryl group.

In the seventh aspect, the present invention relates to the polymerizable composition according to any one of the first to sixth aspects, wherein the polymerizable compound (b) comprises a fluorene compound (b1) of formula [3]:

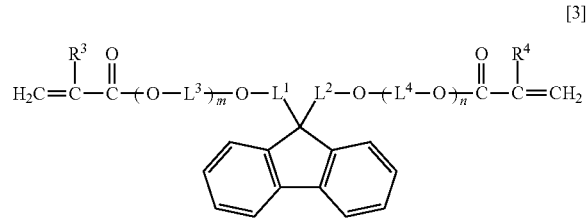

[3]

(wherein $R^3$ and $R^4$ are each independently a hydrogen atom or methyl group, $L^1$ and $L^2$ are each independently a phenylene group optionally having a substituent, or a naphthalenediyl group optionally having a substituent, $L^3$ and $L^4$ are each independently a $C_{1-6}$ alkylene group, and m and n are each independently 0 or a positive integer that satisfies $0 \le m+n \le 40$).

In the eighth aspect, the present invention relates to the polymerizable composition according to any one of the first to seventh aspects, wherein the polymerizable compound (b) comprises an aromatic vinyl compound (b2) of formula [4]:

[4]

(wherein q is an integer of 1 to 3, when q is 1, $L^5$ is a hydrogen atom, a $C_{1-20}$ monovalent aliphatic hydrocarbon residue optionally substituted with phenyl group, or a $C_{1-20}$ monovalent aliphatic hydrocarbon residue optionally containing an ether bond, when q is 2, $L^5$ is a single bond, an oxygen atom, a $C_{1-20}$ divalent aliphatic hydrocarbon residue optionally substituted with phenyl group, or a $C_{1-20}$ divalent aliphatic hydrocarbon residue optionally containing an ether bond, when q is 3, $L^5$ is a $C_{1-20}$ trivalent aliphatic hydrocarbon residue optionally substituted with phenyl group, or a $C_{1-20}$ trivalent aliphatic hydrocarbon residue optionally containing an ether bond, $R^5$ is a hydrogen atom or methyl group, $Ar^3$ is a p+1-valent aromatic hydrocarbon residue, and each p is independently 1 or 2).

In the ninth aspect, the present invention relates to the polymerizable composition according to any one of the first to eighth aspects, wherein the polymerizable compound (b) comprises a polymerizable alkoxy silicon compound (b3) of formula [5]:

[5]

(wherein X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^4$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^6$ is methyl group, ethyl group, or isopropyl group).

In the tenth aspect, the present invention relates to the polymerizable composition according to any one of the first to ninth aspects, wherein a cured product obtained from the composition has an Abbe number of 23 or less.

In the eleventh aspect, the present invention relates to a cured product of the polymerizable composition according to any one of the first to tenth aspects.

In the twelfth aspect, the present invention relates to a material for resin lenses having a high refractive index of 1.62 or more, the material comprising the polymerizable composition according to any one of the first to tenth aspects.

In the thirteenth aspect, the present invention relates to a resin lens prepared from the polymerizable composition according to any one of the first to tenth aspects.

In the fourteenth aspect, the present invention relates to a process for producing a molded article, comprising: a step of introducing the polymerizable composition according to any one of the first to tenth aspects into space between a support and a mold in contact with each other, or internal space of a separable mold; and a step of photopolymerizing the introduced composition by light exposure.

In the fifteenth aspect, the present invention relates to the production process according to the fourteenth aspect, further comprising: a step of taking the obtained photopolymer out of the space filled therewith for mold release; and a step of heating the photopolymer before, during, or after the mold release.

In the sixteenth aspect, the present invention relates to the production process according to the fourteenth or fifteenth aspect, wherein the molded article is a lens for a camera module.

In the seventeenth aspect, the present invention relates to a reactive polysiloxane being a polycondensation product of an alkoxy silicon compound comprising at least an alkoxy silicon compound A of formula [1]:

[1]

(wherein X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^1$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^1$ is methyl group, ethyl group, or isopropyl group).

In the eighteenth aspect, the present invention relates to the reactive polysiloxane according to the seventeenth aspect, wherein the X is vinylphenyl group.

In the nineteenth aspect, the present invention relates to the reactive polysiloxane according to the seventeenth or eighteenth aspect, wherein the $Ar^1$ is a condensed ring hydrocarbon group having two or more benzene ring structures.

In the twentieth aspect, the present invention relates to the reactive polysiloxane according to the nineteenth aspect, wherein the $Ar^1$ is phenanthryl group.

In the twenty-first aspect, the present invention relates to the reactive polysiloxane according to any one of the seventeenth to twentieth aspects, wherein the alkoxy silicon compound further comprises an alkoxy silicon compound different from the alkoxy silicon compound A of formula [1].

In the twenty-second aspect, the present invention relates to the reactive polysiloxane according to any one of the seventeenth to twenty-first aspects, wherein the alkoxy silicon compound further comprises alkoxy silicon compound B of formula [2]:

$$Ar^2\text{—}Si(OR^2)_3 \quad [2]$$

(wherein $Ar^2$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^2$ is methyl group, ethyl group, or isopropyl group).

In the twenty-third aspect, the present invention relates to the reactive polysiloxane according to the twenty-second aspect, wherein the $Ar^2$ is phenanthryl group.

Effects of the Invention

The polymerizable composition of the present invention can not only achieve optical properties (low Abbe number and high refractive index) desirable for an optical device, for example, a lens for high-resolution camera modules, but also achieve heat resistance (crack resistance and dimensional stability, etc.) suitable for an implementation process of a high-resolution camera module, in a cured product thereof.

Thus, the material for resin lenses having a high refractive index according to the present invention, comprising the polymerizable composition can be suitably used as a lens for high-resolution camera modules.

The production process of the present invention can efficiently produce a molded article, particularly, a lens for camera modules.

The polymerizable composition of the present invention has a viscosity sufficiently handleable in a solvent-free form. Therefore, the polymerizable composition of the present invention is moldable by the application of compression processing (imprint technology) using a mold such as a die and is also excellent in mold release properties from the mold after molding. Thus, a molded article can be suitably produced.

BRIEF DESCRIPTION OF THE DRAWINGS

FIG. 1 is a diagram showing the $^1$H NMR spectrum of dimethoxy(phenanthren-9-yl)(4-vinylphenyl)silane obtained in Production Example 1.

FIG. 2 is a diagram showing the NMR spectrum of trimethoxy(9-phenanthryl)silane obtained in Production Example 2.

FIG. 3 is a diagram showing the $^1$H NMR spectrum of dimethoxy(phenyl)(4-vinylphenyl)silane obtained in Production Example 3.

MODES FOR CARRYING OUT THE INVENTION

<<Polymerizable Composition>>

The polymerizable composition of the present invention is a polymerizable composition comprising a specific reactive polysiloxane as a component (a) and a polymerizable compound having at least one polymerizable double bond as a component (b).

Hereinafter, each component will be described in detail.

<(a) Reactive Polysiloxane>

The reactive polysiloxane (a) used in the present invention is a polycondensation product of an alkoxy silicon compound comprising at least alkoxy silicon compound A having a specific structure mentioned later. The polycondensation product includes a polycondensation product of the alkoxy silicon compound A, and a copolycondensation product of the alkoxy silicon compound A with an additional alkoxy silicon compound different from the alkoxy silicon compound A (hereinafter, in the present specification, polycondensation and copolycondensation are also simply referred to as "polycondensation" together). Preferred examples of the additional alkoxy silicon compound different from the alkoxy silicon compound A include, but are not particularly limited to, alkoxy silicon compound B having a specific structure mentioned later. Specifically, the reactive polysiloxane (a) is a compound obtained by polycondensing the alkoxy silicon compound described above in the presence of an acid or a base. The present invention is also directed to the reactive polysiloxane.

[Alkoxy Silicon Compound A]

The alkoxy silicon compound A is a compound of the following formula [1]:

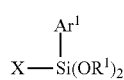

$$X\text{—}Si(OR^1)_2\text{—}Ar^1 \quad [1]$$

In formula [1] described above, X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^1$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^1$ is methyl group, ethyl group, or isopropyl group.

Examples of the phenyl group having at least one substituent having a polymerizable double bond as X include 2-vinylphenyl group, 3-vinylphenyl group, 4-vinylphenyl group, 4-vinyloxyphenyl group, 4-allylphenyl group, 4-allyloxyphenyl group, and 4-isopropenylphenyl group.

Examples of the naphthyl group having at least one substituent having a polymerizable double bond as X include 4-vinylnaphthalen-1-yl group, 5-vinylnaphthalen-1-yl group, 6-vinylnaphthalen-2-yl group, 5-vinyloxynaphthalen-1-yl group, 5-allylnaphthalen-1-yl group, 4-allyloxynaphthalen-1-yl group, 5-allyloxynaphthalen-1-yl group, 8-allyloxynaphthalen-1-yl group, and 5-isopropenylnaphthalen-1-yl group.

Examples of the biphenyl group having at least one group having a polymerizable double bond as X include 4'-vinyl-[1,1'-biphenyl]-2-yl group, 4'-vinyl-[1,1'-biphenyl]-3-yl group, 4'-vinyl-[1,1'-biphenyl]-4-yl group, 4'-vinyloxy-[1,1'-biphenyl]-4-yl group, 4'-allyl-[1,1'-biphenyl]-4-yl group, 4'-allyloxy-[1,1'-biphenyl]-4-yl group, and 4'-isopropenyl-[1,1'-biphenyl]-4-yl group.

Examples of the phenanthryl group having at least one group having a polymerizable double bond as X include 3-vinylphenanthren-9-yl group, 7-vinylphenanthren-9-yl group, 10-vinylphenanthren-9-yl group, 7-vinylphenanthren-2-yl group, 6-vinylphenanthren-3-yl group, 10-vinylphenanthren-3-yl group, 3-vinyloxyphenanthren-9-yl group, 3-allylphenanthren-9-yl group, 3-allyloxyphenantluen-9-yl group, and 3-isopropenylphenanthren-9-yl group.

Among others, the X is preferably a phenyl group having at least one group having a polymerizable double bond, more preferably vinylphenyl group.

Examples of the condensed ring hydrocarbon group having two or more benzene ring structures as $Ar^1$ include monovalent groups derived from naphthalene, phenanthrene, anthracene, triphenylene, pyrene, chrysene, naphthacene, biphenylene, and fluorene.

Examples of the hydrocarbon ring assembly group in which two or more aromatic rings are directly bonded through a single bond include monovalent groups derived from biphenyl, terphenyl, quaterphenyl, binaphthalene, phenylnaphthalene, phenylfluorene, and diphenylfluorene.

Examples of the $C_{1-6}$ alkyl group optionally present as a substituent on the condensed ring hydrocarbon group and the hydrocarbon ring assembly group include methyl group, ethyl group, n-propyl group, isopropyl group, n-butyl group, isobutyl group, sec-butyl group, a tert-butyl group, n-pentyl group, cyclopentyl group, n-hexyl group, and cyclohexyl group.

Among others, the $Ar^1$ is preferably a condensed ring hydrocarbon group having two or more benzene ring structures (optionally substituted with a $C_{1-6}$ alkyl group), more preferably phenanthryl group.

Specific examples of the compound of formula [1] include, but are not limited to, dimethoxy(9-phenanthryl)(4-vinylphenyl)silane, diethoxy(9-phenanthryl)(4-vinylphenyl)silane, diisopropoxy(9-phenanthryl)(4-vinylphenyl)silane, dimethoxy(9-phenanthryl)(4-vinylnaphthalen-1-yl)silane, dimethoxy(9-phenanthryl)(4'-vinyl-[1,1'-biphenyl]-4-yl)silane, dimethoxy(9-phenanthryl)(3-vinylphenanthren-9-yl)silane, dimethoxy(1-naphthyl)(4-vinylphenyl)silane, dimethoxy(2-naphthyl)(4-vinylphenyl)silane, dimethoxy(2-phenanthryl)(4-vinylphenyl)silane, dimethoxy(3-phenanthryl)(4-vinylphenyl)silane, dimethoxy(9-phenanthryl)(4-vinylphenyl)silane, and [1,1'-biphenyl]-4-yldimethoxy(4-vinylphenyl)silane.

[Alkoxy Silicon Compound B]

The alkoxy silicon compound B is a compound of the following formula [2]:

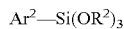  [2]

In formula [2] described above, $Ar^2$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^2$ is methyl group, ethyl group, or isopropyl group.

Examples of the condensed ring hydrocarbon group having two or more benzene ring structures (optionally substituted with a $C_{1-6}$ alkyl group) as $Ar^2$ include monovalent groups derived from naphthalene, phenanthrene, anthracene, triphenylene, pyrene, chrysene, naphthacene, biphenylene, and fluorene.

Examples of the hydrocarbon ring assembly group in which two or more aromatic rings are directly bonded through a single bond include monovalent groups derived from biphenyl, terphenyl, quaterphenyl, binaphthalene, phenylnaphthalene, phenylfluorene, and diphenylfluorene.

Examples of the $C_{1-6}$ alkyl group optionally present as a substituent on the condensed ring hydrocarbon group and the hydrocarbon ring assembly group include methyl group, ethyl group, n-propyl group, isopropyl group, n-butyl group, isobutyl group, sec-butyl group, tert-butyl group, n-pentyl group, cyclopentyl group, n-hexyl group, and cyclohexyl group.

Among others, the $Ar^2$ is preferably a condensed ring hydrocarbon group having two or more benzene ring structures (optionally substituted with a $C_{1-6}$ alkyl group), more preferably phenanthryl group.

Specific examples of the compound of formula [2] include, but are not limited to, trimethoxy(1-naphthyl)silane, triethoxy(1-naphthyl)silane, triisopropoxy(1-naphthyl)silane, trimethoxy(2-naphthyl)silane, triethoxy(2-naphthyl)silane, triisopropoxy(2-naphthyl)silane, trimethoxy(2-phenanthryl)silane, trimethoxy(3-phenanthryl)silane, trimethoxy(9-phenanthryl)silane, triethoxy(9-phenanthryl)silane, triisopropoxy(9-phenanthryl)silane, [1,1'-biphenyl]-4-yltrimethoxysilane, [1,1'-biphenyl]-4-yltriethoxysilane, and [1,1'-biphenyl]-4-yltriisopropoxysilane.

Among others, the alkoxy silicon compound in the reactive polysiloxane (a) preferably comprises, at least, at least one compound selected from the group consisting of compounds of the following formula [1a], formula [1b], and formula [1c], and at least one compound selected from the group consisting of compounds of the following formula [2a], formula [2b], and formula [2c]:

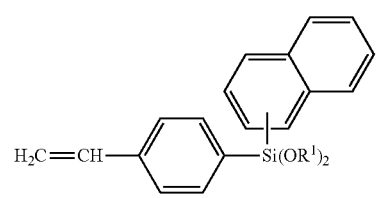  [1a]

In formula [1a] described above, $R^1$ is as defined in the formula [1].

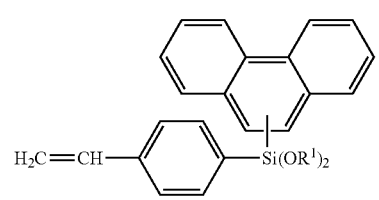  [1b]

In formula [1b] described above, $R^1$ is as defined in the formula [1].

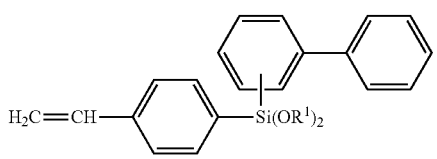

In formula [1c] described above, $R^1$ is as defined in the formula [1].

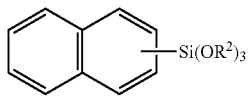

In formula [2a] described above, $R^2$ is as defined in the formula [2].

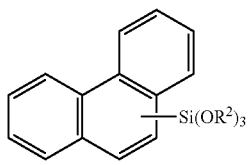

In formula [2b] described above, $R^2$ is as defined in the formula [2].

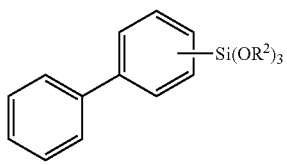

In formula [2c] described above, $R^2$ is as defined in the formula [2].

The reactive polysiloxane as the component (a) is particularly preferably a reactive polysiloxane obtained by polycondensing the alkoxy silicon compounds of formula [1a] and formula [2b], the alkoxy silicon compounds of formula [1b] and formula [2a], the alkoxy silicon compounds of formula [1b] and formula [2b], the alkoxy silicon compounds of formula [1b] and formula [2c], or the alkoxy silicon compounds of formula [1c] and formula [2b] in the presence of an acid or a base. Among others, the reactive polysiloxane is preferably a reactive polysiloxane obtained by polycondensing an alkoxy silicon compound comprising at least the compounds of formula [1b] and formula [2b] in the presence of an acid or a base.

[Mixing Ratio Between Alkoxy Silicon Compound A and Alkoxy Silicon Compound B]

When the alkoxy silicon compound constituting the reactive polysiloxane as the component (a) comprises the alkoxy silicon compound A of formula [1] as well as the alkoxy silicon compound different from the alkoxy silicon compound A, for example, the alkoxy silicon compound B of formula [2], the molar mixing ratio required for the polycondensation reaction of these alkoxy silicon compounds is not particularly limited and is usually preferably in the range of 9 mol or less of the alkoxy silicon compound B with respect to one mol of the alkoxy silicon compound A, for the purpose of stabilizing the physical properties of a cured product, and more preferably in the range of 1.5 mol or less of the alkoxy silicon compound B. When the molar mixing ratio of the alkoxy silicon compound B to the number of moles of the alkoxy silicon compound A is 9 or less, a sufficient cross-linking density is obtained, and dimensional stability against heat is further improved. In addition, a cured product having a higher refractive index and a lower Abbe number can be obtained.

The alkoxy silicon compound A or the alkoxy silicon compound B mentioned above can be appropriately selected and used from the compounds according to the need. A plurality of compounds may be used in combination as the alkoxy silicon compound A or the alkoxy silicon compound B. In this case, the molar mixing ratio also falls within the range described above in terms of the ratio between the total molar quantity of the alkoxy silicon compounds A and the total molar quantity of the alkoxy silicon compounds B.

[Acidic or Basic Catalyst]

The polycondensation reaction of the alkoxy silicon compound comprising at least the alkoxy silicon compound A of formula [1], for example, the alkoxy silicon compound A of formula [1], or the polycondensation reaction of the alkoxy silicon compound comprising the alkoxy silicon compound A of formula [1] and the alkoxy silicon compound B of formula [2] is suitably carried out in the presence of an acidic or basic catalyst.

The catalyst for use in the polycondensation reaction is not particularly limited by its type as long as the catalyst is dissolved or uniformly dispersed in a solvent mentioned later. The catalyst can be appropriately selected and used according to the need.

Examples of the catalyst that can be used include: inorganic acids such as hydrochloric acid, nitric acid, and sulfuric acid, and organic acids such as acetic acid and oxalic acid, as acidic compounds; alkali metal hydroxides, alkaline earth metal hydroxides, ammonium hydroxide, quaternary ammonium salts, and amines etc. as basic compounds; and $NH_4F$ and $NR_4F$ etc. as fluorides. In this context, R is one or more groups selected from the group consisting of a hydrogen atom, a linear alkyl group having a carbon atom number of 1 to 12, a branched alkyl group having a carbon atom number of 3 to 12, and a cyclic alkyl group having a carbon atom number of 3 to 12.

These catalysts can be used alone or in combination of two or more thereof.

Examples of the acidic compound include hydrochloric acid, nitric acid, sulfuric acid, acetic acid, oxalic acid, and boric acid.

Examples of the basic compound include sodium hydroxide, potassium hydroxide, magnesium hydroxide, calcium hydroxide, strontium hydroxide, barium hydroxide, ammonium hydroxide, tetramethylammonium hydroxide, tetraethylammonium hydroxide, tetrabutylammonium hydroxide, and triethylamine.

Examples of the fluoride can include ammonium fluoride, tetramethylammonium fluoride, and tetrabutylammonium fluoride.

Among these catalysts, one or more selected from the group consisting of hydrochloric acid, acetic acid, potassium hydroxide, calcium hydroxide, barium hydroxide, and tetraethylammonium hydroxide are preferably used.

The amount of the catalyst used is 0.01 to 10% by mass, preferably 0.1 to 5% by mass, with respect to the total mass of the alkoxy silicon compounds. When the amount of the catalyst used is set to 0.01% by mass or more, the reaction proceeds more favorably. Use of the catalyst at 10% by mass or less suffices in consideration of cost efficiency.

[Polycondensation Reaction]

A feature of the reactive polysiloxane (polycondensation product) according to the present invention is the structure of the alkoxy silicon compound A. The reactive group (polymerizable double bond) contained in the alkoxy silicon compound A used in the present invention is easily polymerized by a radical or a cation and exhibits high heat resistance after polymerization (after curing).

The hydrolytic polycondensation reaction of the alkoxy silicon compound comprising at least the alkoxy silicon compound A, for example, the alkoxy silicon compound A, or the hydrolytic polycondensation reaction of the alkoxy silicon compound comprising the alkoxy silicon compound A and the alkoxy silicon compound B may be performed in the absence of a solvent. Alternatively, a solvent, such as tetrahydrofuran (THF), mentioned later which is inert to the alkoxy silicon compound used, may be used as a reaction solvent. Use of such a reaction solvent has the advantages that: the reaction system becomes easily homogeneous; and more stable polycondensation reaction is performed.

The synthesis reaction of the reactive polysiloxane may be performed in the absence of a solvent, as mentioned above. However, a solvent can be used for more homogeneous reaction without any problem. The solvent is not particularly limited as long as the solvent does not react with the alkoxy silicon compound used and dissolves a polycondensation product thereof.

Examples of such a reaction solvent include: ketones such as acetone and methyl ethyl ketone (MEK); aromatic hydrocarbons such as benzene, toluene, and xylene; ethers such as tetrahydrofuran (THF), 1,4-dioxane, diisopropyl ether, and cyclopentyl methyl ether (CPME); glycols such as ethylene glycol, propylene glycol, and hexylene glycol; glycol ethers such as ethyl cellosolve, butyl cellosolve, ethyl carbitol, butyl carbitol, diethyl cellosolve, and diethyl carbitol; and amides such as N-methyl-2-pyrrolidone (NMP) and N,N-dimethylformamide (DMF). These solvents may be used alone or as a mixture of two or more thereof.

The reactive polysiloxane used in the present invention is obtained by performing the hydrolytic polycondensation of the alkoxy silicon compound comprising at least the alkoxy silicon compound A of formula [1], for example, the alkoxy silicon compound A of formula [1], or the alkoxy silicon compound comprising the alkoxy silicon compound A of formula [1] and the alkoxy silicon compound B of formula [2], in the presence of the acidic or basic catalyst. The reaction temperature required for the hydrolytic polycondensation is 20 to 150° C., more preferably 30 to 120° C.

The reaction time is not particularly limited as long as the reaction time is equal to or longer than the time required for completing increase in the molecular weight of the polycondensation product and stabilizing a molecular weight distribution. More specifically, the reaction time is several hours to several days.

After the completion of polycondensation reaction, preferably, the obtained reactive polysiloxane is recovered by an arbitrary method such as filtration or solvent removal by distillation and appropriately subjected to purification treatment according to the need.

One example of the process for producing the reactive polysiloxane used in the present invention includes a process comprising polycondensing the alkoxy silicon compound comprising at least the alkoxy silicon compound A of formula [1], for example, the alkoxy silicon compound A of formula [1], or the alkoxy silicon compound comprising the alkoxy silicon compound A of formula [1] and the alkoxy silicon compound B of formula [2], in the presence of a base, and removing the base using a cation-exchange resin.

The base and the amount of the base used can adopt one or more compounds selected from the group consisting of the basic compound and the fluoride mentioned above, and the amount of the compound(s) used. Preferably, one or more selected from the group consisting of potassium hydroxide, calcium hydroxide, barium hydroxide, and tetraethylammonium hydroxide can be used as the base.

The reaction conditions, etc. for use in the polycondensation reaction, or the reaction solvent, etc. can adopt those mentioned above.

After the completion of reaction, an ion-exchange resin having a sulfo group as an ion group is preferably used as the cation-exchange resin to remove the base.

For example, a styrenic (styrene-divinylbenzene copolymer) or acrylic resin having a matrix structure generally used can be used as the cation-exchange resin. The cation-exchange resin may be any of a strongly acidic cation-exchange resin having a sulfo group as an ion group and a weakly acidic cation-exchange resin having a carboxy group as an ion group. Various forms such as granular, fibrous, and membrane forms can be used as the form of the cation-exchange resin. Commercially available products can be suitably used as these cation-exchange resins.

Among others, a strongly acidic cation-exchange resin having a sulfo group as an ion group is preferably used.

Examples of the commercially available strongly acidic cation-exchange resin include: Amberlite® 15, Amberlite® 200, Amberlite® 200C, Amberlite® 200CT, Amberlite® 252, Amberlite® 1200 H, Amberlite® IR120B, Amberlite® IR120 H, Amberlite® IR122 Na, Amberlite® IR124, Amberlite® IRC50, Amberlite® IRC86, Amberlite® IRN77, Amberlite® IRP-64, Amberlite® IRP-69, Amberlite® CG-50, Amberlite® CG-120, Amberjet® 1020, Amberjet® 1024, Amberjet® 1060, Amberjet® 1200, Amberjet® 1220, Amberlyst® 15, Amberlyst® 15DRY, Amberlyst® 15JWET, Amberlyst® 16, Amberlyst® 16WET, Amberlyst® 31WET, Amberlyst® 35WET, Amberlyst® 36, Dowex® 50Wx2, Dowex® 50Wx4, Dowex® 50Wx8, Dowex® DR-2030, Dowex® DR-G8, Dowex® HCR-W2, Dowex® 650C UPW, Dowex® G-26, Dowex® 88, Dowex® M-31, Dowex® N-406, Dowex® Monosphere® 650C, Dowex® Monosphere® 88, Dowex® Monosphere® M-31, Dowex® Monosphere® 99K1320, Dowex® Monosphere® 99K/350, Dowex® Monosphere® 99Ca/320, Dowex Marathon® MSC, and Dowex Marathon® C [all manufactured by The Dow Chemical Company]; Diaion® EXC04, Diaion® HPK25, Diaion® PK208, Diaion® PK212, Diaion® PK216, Diaion® PK220, Diaion® PK228L, Diaion® RCP160M, Diaion® SK1B, Diaion® SK1BS, Diaion® SK104, Diaion® SK110, Diaion® SK112, Diaion® SK116, Diaion® UBK510L, and Diaion® UBK555 [all manufactured by Mitsubishi Chemical Corp.]; and Lewatit® MonoPlus S100 and Lewatit® MonoPlus SP112 [both manufactured by Lanxess AG].

Examples of the commercially available weakly acidic cation-exchange resin include: Amberlite® CG-50, Amberlite® FPC3500, Amberlite® IRC50, Amberlite® IRC76, Amberlite® IRC86, Amberlite® IRP-64, and Dowex® MAC-3 [all manufactured by The Dow Chemical Company]; and Diaion® CWK30/S, Diaion® WK10, Diaion® WK11, Diaion® WK40, Diaion® WK100, and Diaion® WT01S [all manufactured by Mitsubishi Chemical Corp.].

The polycondensation compound obtained through the reaction as mentioned above has a weight-average molecular weight Mw of 500 to 100,000, preferably 500 to 30,000, and a degree of distribution: Mw (weight-average molecular weight)/Mn (number-average molecular weight) of 1.0 to 10, measured on the basis of polystyrene by GPC.

The reactive polysiloxane (a) is a compound having at least a siloxane unit of $[X(Ar^1)SiO]$, for example, a compound having a cross-linked structure having at least siloxane units of $[X(Ar^1)SiO]$ and $[Ar^2SiO_{3/2}]$.

<(b) Polymerizable Compound Having at Least One Polymerizable Double Bond>

The polymerizable compound (b) used in the present invention is a compound having at least one polymerizable double bond and preferably comprises a fluorene compound (b1) of formula [3] mentioned later. In a preferred aspect, the polymerizable compound (b) comprises an aromatic vinyl compound (b2) of formula [4] mentioned later. In a more preferred aspect, the polymerizable compound (b) comprises a polymerizable alkoxy silicon compound (b3) of formula [5] mentioned later.

In the present invention, the content of the polymerizable compound (b) [total amount of a fluorene compound (b1), an aromatic vinyl compound (b2), a polymerizable alkoxy silicon compound (b3), and an additional polymerizable compound (b4) mentioned later] can be 10 to 500 parts by mass, preferably 30 to 250 parts by mass, with respect to 100 parts by mass of the component (a).

<(b1) Fluorene Compound>

The fluorene compound (b1) used in the present invention is a compound of formula [3]:

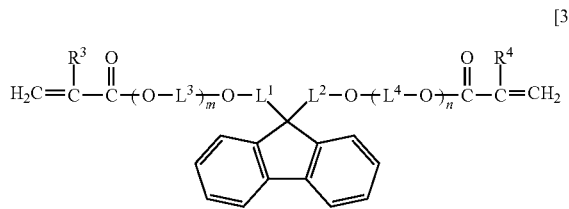

[3]

In formula [3] described above, $R^3$ and $R^4$ are each independently a hydrogen atom or methyl group, $L^1$ and $L^2$ are each independently a phenylene group optionally having a substituent, or a naphthalenediyl group optionally having a substituent, $L^3$ and $L^4$ are each independently a $C_{1-6}$ alkylene group, and m and n are each independently 0 or a positive integer that satisfies $0 \le m+n \le 40$.

Examples of the phenylene group optionally having a substituent as $L^1$ and $L^2$ include o-phenylene group, m-phenylene group, p-phenylene group, 2-methylbenzene-1,4-diyl group, 2-aminobenzene-1,4-diyl group, 2,4-dibromobenzene-1,3-diyl group, and 2,6-dibromobenzene-1,4-diyl group.

Examples of the naphthalenediyl group optionally having a substituent as $L^1$ and $L^2$ include 1,2-naphthalenediyl group, 1,4-naphthalenediyl group, 1,5-naphthalenediyl group, 1,8-naphthalenediyl group, 2,3-naphthalenediyl group, and 2,6-naphthalenediyl group.

Examples of the $C_{1-6}$ alkylene group as $L^3$ and $L^4$ include methylene group, ethylene group, trimethylene group, 1-methylethylene group, tetramethylene group, 1-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

The $C_{1-6}$ alkylene group as $L^3$ and $L^4$ is preferably a $C_{2-3}$ alkylene group.

In the compound of formula [3], m and n each independently preferably satisfy $0 \le m+n \le 30$, more preferably $2 \le m+n \le 20$.

Specific examples of the compound of formula [3] include, but are not limited to: 9,9-bis(4-(2-(meth)acryloyloxyethoxy)phenyl)-9H-fluorene; OGSOL® EA-0200, OGSOL® EA-0300, OGSOL® EA-F5003, OGSOL® EA-F5503, OGSOL® EA-F5510, OGSOL® EA-F5710, and OGSOL® GA-5000 [all manufactured by Osaka Gas Chemicals Co., Ltd.]; and NK Ester A-BPEF [manufactured by Shin-Nakamura Chemical Co., Ltd.] (in the present invention, the (meth)acryloyl group refers to both an acryloyl group and a methacryloyl group).

When the polymerizable composition of the present invention contains the component (b1) as the component (b), its content is 10 to 500 parts by mass with respect to 100 parts by mass of the component (a). Among others, the content is preferably 20 to 250 parts by mass.

<(b2) Aromatic Vinyl Compound>

The aromatic vinyl compound (b2) used in the present invention is a compound of formula [4].

[4]

In formula [4] described above, q is an integer of 1 to 3, when q is 1, $L^5$ is a hydrogen atom, a $C_{1-20}$ monovalent aliphatic hydrocarbon residue optionally substituted with phenyl group, or a $C_{1-20}$ monovalent aliphatic hydrocarbon residue optionally containing an ether bond, when q is 2, $L^5$ is a single bond, an oxygen atom, a $C_{1-20}$ divalent aliphatic hydrocarbon residue optionally substituted with phenyl group, or a $C_{1-20}$ divalent aliphatic hydrocarbon residue optionally containing an ether bond, when q is 3, $L^5$ is a $C_{1-20}$ trivalent aliphatic hydrocarbon residue optionally substituted with phenyl group, or a $C_{1-20}$ trivalent aliphatic hydrocarbon residue optionally containing an ether bond, $R^5$ is a hydrogen atom or methyl group, $Ar^3$ is a p+1-valent aromatic hydrocarbon residue, and each p is independently 1 or 2.

Examples of the $C_{1-20}$ aliphatic hydrocarbon in the $C_{1-20}$ monovalent aliphatic hydrocarbon residue optionally substituted with phenyl group, the $C_{1-20}$ divalent aliphatic hydrocarbon residue optionally substituted with phenyl group, the $C_{1-20}$ trivalent aliphatic hydrocarbon residue optionally substituted with phenyl group, the $C_{1-20}$ monovalent aliphatic hydrocarbon residue optionally containing an ether bond, the $C_{1-20}$ divalent aliphatic hydrocarbon residue optionally containing an ether bond, and the $C_{1-20}$ trivalent aliphatic hydrocarbon residue optionally containing an ether bond as $L^5$ include: linear alkanes such as methane, ethane, propane, n-butane, n-pentane, n-hexane, n-heptane, n-octane, n-nonane, n-decane, n-undecane, n-dodecane, n-tridecane, n-tetradecane, n-pentadecane, n-hexadecane, n-heptadecane, n-octadecane, n-nonadecane, and n-eicosane; branched alkanes such as 2-methylpropane and 2,2-dimethylpropane; and cyclic alkanes such as cyclopentane and cyclohexane. Examples of the $C_{1-20}$ monovalent aliphatic hydrocarbon residue include alkyl groups derived from the linear alkanes, the branched alkanes or the cyclic alkanes by the removal of one hydrogen atom. Examples of the $C_{1-20}$ divalent aliphatic hydrocarbon residue include alkanediyl groups derived from the linear alkanes, the branched alkanes or the cyclic alkanes by the removal of two hydrogen atoms. Examples of the $C_{1-20}$ trivalent aliphatic hydrocarbon residue include alkanetriyl groups derived from the linear alkanes, the branched alkanes or the cyclic alkanes by the removal of three hydrogen atoms.

Examples of such $L^5$ include methyl group, ethyl group, n-propyl group, isopropyl group, n-butyl group, n-hexyl group, cyclohexyl group, benzyl group, phenethyl group, methoxymethyl group, ethoxymethyl group, 2-methoxyethyl group, methylene group, ethylene group, trimethylene group, 1-methylethylene group, propane-2,2-diyl group, tetramethylene group, pentamethylene group, 2,2-dimethyltrimethylene group, hexamethylene group, 3-methylpentamethylene group, cyclohexane-1,4-diyl group, a diethylene glycol residue (—CH$_2$CH$_2$OCH$_2$CH$_2$—), a triethylene glycol residue (—(CH$_2$CH$_2$O)$_2$CH$_2$CH$_2$—), a dipropylene glycol residue (—CH(CH$_3$)CH$_2$OCH(CH$_3$)CH$_2$—), oxytetramethyleneoxy group, propane-1,1,1-triyl group, propane-1,1,3-triyl group, butane-1,2,4-triyl group, and cyclohexane-1,3,5-triyl group.

Examples of the p+1-valent aromatic hydrocarbon residue as $Ar^3$ include groups derived from aromatic hydrocarbon rings such as benzene and naphthalene by the removal of p+1 hydrogen atoms.

The compound of formula [4] is preferably a compound wherein $L^5$ is a hydrogen atom, q is 1, and p is 2.

Specific examples of the compound of formula [4] include styrene, 1-phenethyl-4-vinylbenzene, 1-vinylnaphthalene, 2-vinylnaphthalene, divinylbenzene, diisopropenylbenzene, divinylnaphthalene, 4,4'-divinylbiphenyl, bis(4-vinylphenyl) ether, 1-vinyl-2-(4-vinylphenoxy)benzene, 2,2-bis(4-vinylphenyl)propane, and 1,1,1-tris(4-vinylphenoxy)propane.

Among these compounds, styrene, 1-vinylnaphthalene, divinylbenzene, or 2,2-bis(4-vinylphenyl)propane is preferred, and divinylbenzene is more preferred.

When the polymerizable composition of the present invention contains the component (b2) as the component (b), its content is 1 to 500 parts by mass with respect to 100 parts by mass of the component (a). Among others, the content is preferably 3 to 250 parts by mass.

<(b3) Polymerizable Alkoxy Silicon Compound>

The polymerizable alkoxy silicon compound (b3) used in the present invention is a compound of formula [5]:

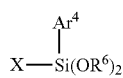

[5]

In formula [5] described above, X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^4$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^6$ is methyl group, ethyl group, or isopropyl group.

Specific examples of X in formula [5] described above include the groups listed as the group X in formula [1] in the alkoxy silicon compound A of formula [1] and can particularly include the groups listed as preferred groups of the group X in formula [1].

Specific examples of $Ar^4$ in formula [5] described above include the groups listed as the group $Ar^1$ in formula [1] and can particularly include the groups listed as preferred groups of the group $Ar^1$ in formula [1].

Specific examples of the compound of formula [5] include the compounds listed as specific examples of the alkoxy silicon compound A of formula [1].

When the polymerizable composition of the present invention contains the component (b3) as the component (b), its content is 1 to 500 parts by mass with respect to 100 parts by mass of the component (a). Among others, the content is preferably 3 to 250 parts by mass.

<(b4) Additional Polymerizable Compound>

The polymerizable compound (b) used in the present invention can comprise an additional polymerizable compound that can be polymerized, other than the fluorene compound (b1), the aromatic vinyl compound (b2), and the polymerizable alkoxy silicon compound (b3).

The additional polymerizable compound is preferably, for example, a vinyl compound or a (meth)acrylate compound other than the components (b1), (b2) and (b3). Examples thereof include mono(meth)acrylate compounds having an aromatic group. In the present invention, the (meth)acrylate compound refers to both an acrylate compound and a methacrylate compound. For example, (meth)acrylic acid refers to acrylic acid and methacrylic acid.

Examples of the (meth)acrylate compound include methyl (meth)acrylate, ethyl (meth)acrylate, 2,2,2-trifluoroethyl (meth)acrylate, n-propyl (meth)acrylate, isopropyl (meth)acrylate, n-butyl (meth)acrylate, sec-butyl (meth)acrylate, isobutyl (meth)acrylate, tert-butyl (meth)acrylate, n-hexyl (meth)acrylate, n-octyl (meth)acrylate, isobornyl (meth)acrylate, adamantyl (meth)acrylate, dicyclopentanyl (meth)acrylate, dicyclopentenyl (meth)acrylate, 2-(dicyclopentanyloxy)ethyl (meth)acrylate, 2-(dicyclopentenyloxy)ethyl (meth)acrylate, tetrahydrofurfuryl (meth)acrylate, ethylene glycol di(meth)acrylate, diethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, 1,3-butanediol di(meth)acrylate, 1,4-butanediol di(meth)acrylate, neopentyl glycol di(meth)acrylate, propoxylated neopentyl glycol di(meth)acrylate, neopentyl glycol mono(hydroxypivalic acid) ester (meth)acrylate, 3-methyl-1,5-pentanediol di(meth)acrylate, 1,6-hexanediol di(meth)acrylate, 2-(3-hydroxy-2-methylpropyl-2-yl)-5-ethyl-5-hydroxymethyl-1,3-dioxane di(meth)acrylate (also called dioxane glycol di(meth)acrylate), tricyclo[5.2.1.0$^{2,6}$]decanedimethanol di(meth)acrylate, trimethylolethane tri(meth)acrylate, trimethylolpropane tri(meth)acrylate, ethoxylated trimethylolpropane tri(meth)acrylate, propoxylated trimethylolpropane tri(meth)acrylate, pentaerythritol tetra(meth)acrylate, ethoxylated pentaerythritol tetra(meth)acrylate, ditrimethylolpropane tetra(meth)acrylate, and dipentaerythritol hexa(meth)acrylate.

Examples of the mono(meth)acrylate compound having an aromatic group include benzyl (meth)acrylate, 2-phenoxyethyl (meth)acrylate, 2-phenoxybenzyl (meth)acrylate, 3-phenoxybenzyl (meth)acrylate, 4-phenoxybenzyl (meth)acrylate, 2-(2-biphenylyloxy)ethyl (meth)acrylate, 2-(3-biphenylyloxy)ethyl (meth)acrylate, 2-(4-biphenylyloxy)ethyl (meth)acrylate, diethylene glycol monophenyl ether (meth)acrylate, polyethylene glycol monophenyl ether (meth)acrylate, 2-hydroxy-3-phenoxypropyl (meth)acrylate, neopentyl glycol benzoate (meth)acrylate, and ethoxylated o-phenylphenol (meth)acrylate.

<(c) Polymerization Initiator>

The polymerizable composition of the present invention may comprise (c) a polymerization initiator in addition to the component (a) and the component (b). Any of a photopolymerization initiator and a thermal polymerization initiator can be used as the polymerization initiator.

Examples of the photopolymerization initiator include alkylphenones, benzophenones, Michler's ketones, acylphosphine oxides, benzoyl benzoates, oxime esters, tetramethylthiuram monosulfides, and thioxanthones.

Particularly, a photofragmentation-type photo radical polymerization initiator is preferred.

Examples of commercially available photo radical polymerization initiators can include: IRGACURE® 184, IRGACURE® 369, IRGACURE® 651, IRGACURE® 500, IRGACURE® 819, IRGACURE® 907, IRGACURE® 784, IRGACURE® 2959, IRGACURE® CGI1700, IRGACURE® CGI1750, IRGACURE® CGI1850, IRGACURE® CG24-61, IRGACURE® TPO, Darocur® 1116, and Darocur® 1173 [all manufactured by BASF Japan, Ltd.]; and ESACURE KIP150, ESACURE KIP65LT, ESACURE KIP100F, ESACURE KT37, ESACURE KT55, ESACURE KT046, and ESACURE KIP75 [all manufactured by Lamberti S.p.A.].

Examples of the thermal polymerization initiator include azos and organic peroxides.

Examples of commercially available azo thermal polymerization initiators can include V-30, V-40, V-59, V-60, V-65, and V-70 [all manufactured by Wako Pure Chemical Industries, Ltd.].

Examples of commercially available organic peroxide thermal polymerization initiators can include, but are not limited to: Perkadox® CH, Perkadox® BC-FF, Perkadox® 14, Perkadox® 16, Trigonox® 22, Trigonox® 23, Trigonox® 121, Kaya Ester® P, Kaya Ester® O, and Kaya Butyl® B [all manufactured by Kayaku Akzo Corp.]; and PERHEXA® HC, PERCUMYL® H, PEROCTA® O, PERHEXYL® O, PERHEXYL® Z, PERBUTYL® O, and PERBUTYL® Z [all manufactured by NOF Corp.].

In the case of adding a polymerization initiator, the polymerization initiator may be used alone or as a mixture of two or more thereof. The amount of the polymerization initiator added is 0.1 to 20 parts by mass, more preferably 0.3 to 10 parts by mass, with respect to 100 parts by mass in total of the polymerizable components, i.e., the component (a) and the component (b).

In a preferred aspect of the present invention, the polymerizable composition exhibits an Abbe number of, for example, 25 or less, preferably 23 or less, in a cured product obtained from the polymerizable composition from the viewpoint of attaining a high refractive index of the resulting cured product.

<Other Additives>

The polymerizable composition of the present invention can further contain, for example, a chain transfer agent, an antioxidant, an ultraviolet absorber, a light stabilizer, a leveling agent, a rheology adjuster, an adhesion aid such as a silane coupling agent, a pigment, a dye, an antifoaming agent, and a polymerization inhibitor, if necessary, without impairing the effect of the present invention.

Examples of the chain transfer agent include thiol compounds including: mercaptocarboxylic acid esters such as methyl mercaptoacetate, methyl 3-mercaptopropionate, 2-ethylhexyl 3-mercaptopropionate, 3-methoxybutyl 3-mercaptopropionate, n-octyl 3-mercaptopropionate, stearyl 3-mercaptopropionate, 1,4-bis(3-mercaptopropionyloxy)butane, 1,4-bis(3-mercaptobutyryloxy)butane, trimethylolethane tris(3-mercaptopropionate), trimethylolethane tris(3-mercaptobutyrate), trimethylolpropane tris(3-mercaptopropionate), trimethylolpropane tris(3-mercaptobutyrate), pentaerythritol tetrakis(3-mercaptopropionate), pentaerythritol tetrakis(3-mercaptobutyrate), dipentaerythritol hexakis(3-mercaptopropionate), dipentaerythritol hexakis(3-mercaptobutyrate), tris[2-(3-mercaptopropionyloxy)ethyl] isocyanurate, and tris[2-(3-mercaptobutyryloxy)ethyl] isocyanurate; alkylthiols such as ethanethiol, 2-methylpropane-2-thiol, n-dodecanethiol, 2,3,3,4,4,5-hexamethylhexane-2-thiol (tert-dodecanethiol), ethane-1,2-dithiol, propane-1,3-dithiol, and benzylthiol; aromatic thiols such as benzenethiol, 3-methylbenzenethiol, 4-methylbenzenethiol, naphthalene-2-thiol, pyridine-2-thiol, benzimidazole-2-thiol, and benzothiazole-2-thiol; mercapto alcohols such as 2-mercaptoethanol and 4-mercapto-1-butanol; and silane-containing thiols such as 3-(trimethoxysilyl)propane-1-thiol and 3-(triethoxysilyl)propane-1-thiol, disulfide compounds including: alkyl disulfides such as diethyl disulfide, dipropyl disulfide, diisopropyl disulfide, dibutyl disulfide, di-tert-butyl disulfide, dipentyl disulfide, diisopentyl disulfide, dihexyl disulfide, dicyclohexyl disulfide, didecyl disulfide, bis(2,3,3,4,4,5-hexamethylhexan-2-yl) disulfide (di-tert-dodecyl disulfide), bis(2,2-diethoxyethyl) disulfide, bis(2-hydroxyethyl) disulfide, and dibenzyl disulfide; aromatic disulfides such as diphenyl disulfide, di-p-tolyl disulfide, di(pyridin-2-yl)pyridyl disulfide, di(benzimidazol-2-yl) disulfide, and di(benzothiazol-2-yl) disulfide; and thiuram disulfides such as tetramethylthiuram disulfide, tetraethylthiuram disulfide, tetrabutylthiuram disulfide, and bis(pentamethylene)thiuram disulfide, and α-methylstyrene dimers.

In the case of adding a chain transfer agent, the chain transfer agent may be used alone or as a mixture of two or more thereof. The amount of the chain transfer agent added is 0.01 to 20 parts by mass, preferably 0.1 to 15 parts by mass, more preferably 0.1 to 10 parts by mass, with respect to 100 parts by mass in total of the polymerizable components, i.e., the component (a) and the component (b).

Examples of the antioxidant include phenol antioxidants, phosphoric acid antioxidants, and sulfide antioxidants. Among these antioxidants, a phenol antioxidant is preferred.

Examples of the phenol antioxidant include: IRGANOX® 245, IRGANOX® 1010, IRGANOX® 1035, IRGANOX® 1076, and IRGANOX® 1135 [all manufactured by BASF Japan, Ltd.]; SUMILIZER® GA-80, SUMILIZER® GP, SUMILIZER® MDP-S, SUMILIZER® BBM-S, and SUMILIZER® WX-R [all manufactured by Sumitomo Chemical Co., Ltd.]; and ADEKA STAB® AO-20, ADEKA STAB® AO-30, ADEKA STAB® AO-40, ADEKA STAB® AO-50, ADEKA STAB® AO-60, ADEKA STAB® AO-80, and ADEKA STAB® AO-330 [all manufactured by ADEKA Corp.].

In the case of adding an antioxidant, the antioxidant may be used alone or as a mixture of two or more thereof. The amount of the antioxidant added is 0.01 to 20 parts by mass, more preferably 0.1 to 10 parts by mass, with respect to 100 parts by mass in total of the polymerizable components, i.e., the component (a) and the component (b).

<Process for Preparing Polymerizable Composition>

The process for preparing the polymerizable composition of the present embodiment is not particularly limited. Examples of the preparation process include: a process comprising mixing the component (a) and the component (b), and, if necessary, the component (c) at a predetermined ratio, further adding thereto other additives, if desired, and mixing the mixture to prepare a homogeneous solution; a process comprising mixing a portion of, for example, the component (a) and the component (b), among these components to prepare a homogeneous solution, then adding thereto the remaining portion of the components, further adding thereto other additives, if desired, and mixing the mixture to prepare a homogeneous solution; or a process further using a routine solvent in addition to these components.

In the case of using a solvent, the solid content ratio of this polymerizable composition is not particularly limited as long as each component is uniformly dissolved in the solvent. The solid content ratio is, for example, 1 to 50% by mass, 1 to 30% by mass, or 1 to 25% by mass. The solid content excludes the solvent component from all the components of the polymerizable composition.

The solution of the polymerizable composition is preferably used after being filtered through a filter or the like having a pore size of 0.1 to 5 μm.

<<Cured Product>>

The polymerizable composition can be exposed to light (photocured) or heated (thermally cured) to obtain a cured product. The present invention is also directed to the cured product of the polymerizable compound.

Examples of the light beam for the light exposure include ultraviolet ray, electron beam, and X-ray. For example, sunlight, a chemical lamp, a low-pressure mercury lamp, a high-pressure mercury lamp, a metal halide lamp, a xenon lamp, or UV-LED can be used as a light source for use in ultraviolet irradiation. The cured product thus exposed to light may be post-baked in order to stabilize its physical properties. The post-baking method is not particularly limited and is usually performed in the ranges of 50 to 260° C. and 1 to 120 minutes using a hot plate, an oven, or the like.

The heating conditions for the thermal curing are not particularly limited and, usually, are appropriately selected from the ranges of 50 to 300° C. and 1 to 120 minutes. Examples of the heating means include, but are not particularly limited to, hot plates and ovens.

The cured product obtained by curing the polymerizable composition of the present invention has an Abbe number as low as, for example, 23 or less and a refractive index as high as, for example, 1.620 or more, at a wavelength of 588 nm (d-ray). Furthermore, the occurrence of cracks or the separation from a support due to heating is suppressed. Thus, the cured product has dimensional stability and as such, can be suitably used as a material for resin lenses having a high refractive index.

<<Molded Article>>

From the polymerizable composition of the present invention, various molded articles can be easily produced concurrently with the formation of the cured product by use of a routine molding method, for example, compression molding (imprint, etc.), casting, injection molding, or blow molding. The present invention is also directed to the molded article thus obtained.

Examples of the process for producing the molded article include a process comprising: a step of introducing the polymerizable composition of the present invention into space between a support and a mold in contact with each other, or internal space of a separable mold; a step of photopolymerizing the introduced composition by light exposure; a step of taking the obtained photopolymer out of the space filled therewith for mold release; and a step of heating the photopolymer before, during, or after the mold release.

The step of photopolymerization by light exposure can be carried out by the application of the conditions described in the preceding section <<Cured product>>.

The conditions for the heating step are not particularly limited and, usually, are appropriately selected from the ranges of 50 to 260° C. and 1 to 120 minutes. Examples of the heating means include, but are not particularly limited to, hot plates and ovens.

The molded article produced by such a process can be suitably used as a lens for camera modules.

EXAMPLES

Hereinafter, the present invention will be described more specifically with reference to Examples. However, the present invention is not limited by Examples given below.

In Examples, apparatuses and conditions used in the preparation of samples and the analysis of physical properties are as follows.

(1) Stirring Deaerator
Apparatus: planetary centrifugal mixer AWATORI RENTARO® ARE-310 manufactured by Thinky Corp.

(2) Spin Coater
Apparatus: Cee® 200× manufactured by Brewer Science, Inc.

(3) UV Exposure
Apparatus: batch-type UV irradiation apparatus (high-pressure mercury lamp 2 kW×1) manufactured by Eye Graphics Co., Ltd.

(4) Nano Imprinter
Apparatus: NM-0801HB manufactured by Meisyo Kiko Co., Ltd.
Compression pressure: 150 N
UV dose: 20 mW/cm$^2$, 150 sec (5) $^1$H NMR Spectrum
Apparatus: AVANCE III HD manufactured by Bruker Corp.
Measurement frequency: 500 MHz
Solvent: CDCl$_3$
Internal standard: tetramethylsilane (δ=0.00 ppm)

(6) Gel Permeation Chromatography (GPC)
Apparatus: Prominence® GPC system manufactured by Shimadzu Corp.
Column: Shodex® GPC KF-804L and GPC KF-803L manufactured by Showa Denko K.K.
Column temperature: 40° C.
Solvent: tetrahydrofuran
Detector: RI
Calibration curve: standard polystyrene (7) Transmittance
Apparatus: ultraviolet-visible and near-infrared spectrophotometer V-670 manufactured by JASCO Corp.
Reference: quartz (for cured film measurement), air (for molded article measurement)

(8) Refractive Index $n_d$ and Abbe Number $v_d$

Apparatus A (for cured film measurement): multiple angle-of-incidence spectroscopic ellipsometer VASE manufactured by J. A. Woollam Japan Corp.

Apparatus B (for molded article measurement): prism coupler model 2010/M manufactured by Metricon Corp.

Measurement temperature: room temperature (approximately 23° C.)

(9) Lens Height

Apparatus: non-contact surface property measurement apparatus PF-60 manufactured by Mitaka Kohki Co., Ltd.

Abbreviations are as defined below.

PheTMS: trimethoxy(9-phenanthryl)silane

SPDMS: dimethoxy(phenyl)(4-vinylphenyl)silane

SPeDMS: dimethoxy(phenanthren-9-yl)(4-vinylphenyl)silane

STMS: trimethoxy(4-vinylphenyl)silane [Shin-Etsu Silicone® KBM-1403 manufactured by Shin-Etsu Chemical Co., Ltd.]

TMOS: tetramethoxysilane [manufactured by Tokyo Chemical Industry Co., Ltd.]

TEAH: aqueous solution containing 35% by mass of tetraethylammonium hydroxide [manufactured by Sigma Aldrich Co. LLC]

DVB: divinylbenzene [DVB-810 manufactured by Nippon Steel & Sumikin Chemical Co., Ltd.]

FDA: bisarylfluorene diacrylate [OGSOL® EA-F5503 manufactured by Osaka Gas Chemicals Co., Ltd.]

DDT: n-dodecanethiol [THIOKALCOL 20 manufactured by Kao Corp.]

PTMB: pentaerythritol tetrakis(3-mercaptobutyrate) [Karenz MT® PEI manufactured by Showa Denko K.K.]

I184: 1-hydroxy cyclohexyl phenyl ketone [IRGACURE® 184 manufactured by BASF SE]

TPO: diphenyl(2,4,6-trimethylbenzoyl)phosphine oxide [IRGACURE® TPO manufactured by BASF Japan, Ltd.]

I245: triethylene glycol bis[3-(3-tert-butyl-4-hydroxy-5-methylphenyl)propionate [IRGANOX® 245 manufactured by BASF Japan, Ltd.]

BHA: 2,6-di-tert-butyl-4-methoxyphenol [manufactured by Tokyo Chemical Industry Co., Ltd.]

PGMEA: propylene glycol monomethyl ether acetate

THF: tetrahydrofuran

[Production Example 1] Production of dimethoxy (phenanthren-9-yl)(4-vinylphenyl)silane (SPeDMS)

A 1 L reaction flask equipped with a condenser was charged with 15.7 g (0.65 mol) of magnesium turnings [manufactured by Kanto Chemical Co., Inc.], and the air in the flask was purged with nitrogen using a nitrogen balloon. A mixture of 151.2 g (0.58 mol) of 9-bromophenanthrene [manufactured by Tokyo Chemical Industry Co., Ltd.] and 518 g of THF was added dropwise thereto at room temperature (approximately 23° C.) over 1 hour, and the mixture was further stirred for 1 hour to prepare a Grignard reagent.

A 2 L reaction flask was charged with 131.9 g (0.58 mol) of STMS and 259 g of THF, and the air in the flask was purged with nitrogen using a nitrogen balloon. The Grignard reagent was added dropwise thereto under reflux (approximately 66° C.) over 30 minutes, and the mixture was further refluxed for 24 hours. From this reaction mixture, THF was distilled off under reduced pressure using an evaporator. Soluble matter was dissolved by the addition of 1,000 g of hexane to the obtained residue and subsequent reflux for 1 hour. Then, insoluble matter was filtered off. To this insoluble matter, 750 g of hexane was added again, and soluble matter was dissolved in the same way as above. Then, insoluble matter was filtered off. The respective filtrates were mixed, and hexane was distilled off under reduced pressure using an evaporator to obtain a crude product. The crude product was recrystallized over 150 g of hexane to obtain 102.4 g (yield: 47%) of SPeDMS of interest.

The $^1$H NMR spectrum of the obtained compound is shown in FIG. 1.

[Production Example 2] Production of trimethoxy(9-phenanthryl)silane (PheTMS)

A 500 mL reaction flask equipped with a condenser was charged with 10.4 g (0.43 mol) of magnesium turnings [manufactured by Kanto Chemical Co., Inc.], and the air in the flask was purged with nitrogen using a nitrogen balloon. A mixture of 100.3 g (0.39 mol) of 9-bromophenanthrene [manufactured by Tokyo Chemical Industry Co., Ltd.] and 346 g of THF was added dropwise thereto at room temperature (approximately 23° C.) over 1 hour, and the mixture was further stirred for 30 minutes to prepare a Grignard reagent.

A 1 L reaction flask was charged with 178.0 g (1.17 mol) of TMOS and 346 g of THF, and the air in the flask was purged with nitrogen using a nitrogen balloon. The Grignard reagent was added dropwise thereto at room temperature (approximately 23° C.) over 30 minutes, and the mixture was further stirred for 2 hours. From this reaction mixture, THF was distilled off under reduced pressure using an evaporator. Soluble matter was dissolved by the addition of 1,000 g of hexane to the obtained residue. Then, insoluble matter was filtered off. To this insoluble matter, 500 g of hexane was added again, and insoluble matter was filtered off in the same way as above. The respective filtrates were mixed, and hexane was distilled off under reduced pressure using an evaporator to obtain a crude product. The crude product was distilled under reduced pressure (1 mmHg, 120 to 150° C.) and then recrystallized over 389 g of methanol to obtain 74.6 g (yield: 64%) of PheTMS of interest.

The $^1$H NMR spectrum of the obtained compound is shown in FIG. 2.

[Production Example 3] Production of dimethoxy(phenyl)(4-vinylphenyl)silane (SPDMS)

A 500 mL reaction flask equipped with a condenser was charged with 10.2 g (0.42 mol) of magnesium turnings [manufactured by Kanto Chemical Co., Inc.], and the air in the flask was purged with nitrogen using a nitrogen balloon. A mixture of 60.0 g (0.38 mol) of bromobenzene [manufactured by Tokyo Chemical Industry Co., Ltd.] and 340 g of THF was added dropwise thereto at room temperature (approximately 23° C.) over 1 hour, and the mixture was further stirred for 1 hour to prepare a Grignard reagent.

A 1 L reaction flask was charged with 85.7 g (0.38 mol) of STMS and 170 g of THF, and the air in the flask was purged with nitrogen using a nitrogen balloon. The Grignard reagent was added dropwise thereto at room temperature (approximately 23° C.) over 30 minutes, and the mixture was further stirred for 2 hours. From this reaction mixture, THF was distilled off under reduced pressure using an evaporator. Soluble matter was dissolved by the addition of 600 g of hexane to the obtained residue. Then, insoluble matter was filtered off. To this insoluble matter, 300 g of hexane was added again, and insoluble matter was filtered off in the same way as above. The respective filtrates were mixed, and hexane was distilled off under reduced pressure using an evaporator to obtain a crude product. The crude product was distilled under reduced pressure (1 mmHg, 140 to 150° C.) to obtain 50.4 g (yield: 49%) of SPDMS of interest.

The $^1$H NMR spectrum of the obtained compound is shown in FIG. 3.

[Example 1] Production of Reactive Polysiloxane 1 (XPe10)

A 50 mL reaction flask equipped with a condenser was charged with 1.36 g (3.23 mmol) of TEAH and 12 g of THF, and the air in the flask was purged with nitrogen using a nitrogen balloon. A mixture of 29.9 g (80.7 mmol) of SPeDMS produced according to Production Example 1 and 24 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 6.0 g of a cation-exchange resin [Amberlyst® 15JWET manufactured by The Dow Chemical Company] washed in advance with THF, and 1.2 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 µm and further washed off with 30 g of ethyl acetate. This filtrate and the washes were combined and added to 897 g of methanol to precipitate a polymer. This precipitate was filtered and dried to obtain 18.9 g of reactive polysiloxane 1 (hereinafter, also abbreviated to XPe10) of interest.

The obtained compound had a weight-average molecular weight Mw of 610 and a degree of distribution: Mw (weight-average molecular weight)/Mn (number-average molecular weight) of 1.2 measured on the basis of polystyrene by GPC.

[Example 2] Production of Reactive Polysiloxane 2 (XPe55)

A 50 mL reaction flask equipped with a condenser was charged with 0.90 g (2.14 mmol) of TEAH, 0.86 g (47.7 mmol) of ion-exchange water, and 7 g of THF, and the air in the flask was purged with nitrogen using a nitrogen balloon. A mixture of 9.9 g (26.8 mmol) of SPeDMS produced according to Production Example 1, 8.0 g (26.8 mmol) of PheTMS produced according to Production Example 2, and 14 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 3.6 g of a cation-exchange resin [Amberlyst® 15JWET manufactured by The Dow Chemical Company] washed in advance with THF, and 0.72 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 µm and further washed off with 18 g of ethyl acetate. This filtrate and the washes were combined and added to 538 g of methanol to precipitate a polymer. This precipitate was filtered and dried to obtain 14.8 g of reactive polysiloxane 2 (hereinafter, also abbreviated to XPe55) of interest.

The obtained compound had a weight-average molecular weight Mw of 1,000 and a degree of distribution: Mw/Mn of 1.0 measured on the basis of polystyrene by GPC.

[Example 3] Production of Reactive Polysiloxane 3 (XPe46)

A 100 mL reaction flask equipped with a condenser was charged with 1.50 g (3.57 mmol) of TEAH, 1.43 g (79.5 mmol) of ion-exchange water, and 12 g of THF, and the air in the flask was purged with nitrogen using a nitrogen balloon. A mixture of 13.2 g (35.6 mmol) of SPeDMS produced according to Production Example 1, 16.0 g (53.6 mmol) of PheTMS produced according to Production Example 2, and 23 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 5.9 g of a cation-exchange resin [Amberlyst® 15JWET manufactured by The Dow Chemical Company] washed in advance with THF, and 1.2 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 µm and further washed off with 29 g of ethyl acetate. This filtrate and the washes were combined and added to 877 g of methanol to precipitate a polymer. This precipitate was filtered and dried to obtain 23.7 g of reactive polysiloxane 3 (hereinafter, also abbreviated to XPe46) of interest.

The obtained compound had a weight-average molecular weight Mw of 1,100 and a degree of distribution: Mw/Mn of 1.0 measured on the basis of polystyrene by GPC.

[Comparative Example 1] Production of Reactive Polysiloxane 4 (PPe10)

A 50 mL reaction flask equipped with a condenser was charged with 0.50 g (1.18 mmol) of TEAH and 3 g of THF, and the air in the flask was purged with nitrogen using a nitrogen balloon. A mixture of 8.0 g (29.6 mmol) of SPDMS produced according to Production Example 3 and 6 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 1.6 g of a cation-exchange resin [Amberlyst® 15JWET manufactured by The Dow Chemical Company] washed in advance with THF, and 0.32 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 µm and further washed off with 8 g of ethyl acetate. This filtrate and the washes were mixed and concentrated to obtain 5.9 g of reactive polysiloxane 4 (hereinafter, also abbreviated to PPe10) of interest.

The obtained compound had a weight-average molecular weight Mw of 1,800 and a degree of distribution: Mw/Mn of 1.4 measured on the basis of polystyrene by GPC.

[Evaluation of Optical Properties of Reactive Polysiloxane]

Three parts by mass of each reactive polysiloxane produced in Examples 1 to 3 and Comparative Example 1, 0.03 parts by mass of I184, and 7 parts by mass of PGMEA were mixed. This solution was filtered through a PTFE syringe filter having a pore size of 0.2 µm to obtain varnish having a solid concentration of 30% by mass.

A quartz substrate was spin-coated (1,500 rpm×30 sec) with each varnish, which was then dried by heating on a hot plate of 100° C. for 1 minute. This coating was exposed to UV at 20 mW/cm$^2$ for 150 seconds in a nitrogen atmosphere and further heated on a hot plate of 150° C. for 20 minutes to prepare a cured film having a film thickness of 1.5 mm. The minimum transmittance at a wavelength of 400 to 800 nm of the obtained cured film was measured. The results are shown in Table 1.

Each cured film was prepared in the same way as above except that the quartz substrate was changed to a silicon wafer. The refractive index $n_d$ and the abbe number $v_d$ at a wavelength of 588 nm (d ray) of the obtained cured film were measured. The results are also shown in Table 1.

TABLE 1

| Example/Comparative Example | Reactive polysiloxane | Transmittance [%] | Refractive index $n_d$ | Abbe number $v_d$ |
|---|---|---|---|---|
| Example 1 | XPe10 | 90.9 | 1.700 | 17.8 |
| Example 2 | XPe55 | 93.5 | 1.756 | 17.4 |
| Example 3 | XPe46 | 94.0 | 1.761 | 17.0 |
| Comparative Example 1 | PPe10 | 91.6 | 1.613 | 25.0 |

As shown in Table 1, the cured products obtained from the reactive polysiloxane of the present invention shown in Examples 1 to 3 were confirmed to have high transparency of 90% or more in terms of transmittance and to exhibit a high refractive index of 1.70 or more.

On the other hand, the cured product obtained from the reactive polysiloxane having no specific structure (Comparative Example 1) was confirmed have a refractive index as low as 1.613, though having a high transmittance. These results demonstrated the superiority of the present invention.

[Example 4 to Example 9 and Comparative Example 2] Preparation of Polymerizable Composition The polysiloxane described in Table 1 as the reactive polysiloxane (a), FDA as the fluorene compound (b1), DVB as the aromatic vinyl compound (b2), SPeDMS produced in Production Example 1 as the polymerizable alkoxy silicon compound (b3), the thiol compound described in Table 2 as a chain transfer agent (reaction accelerator), I184 and TPO as polymerization initiators, I245 as an antioxidant, and BHA as a polymerization inhibitor were added in the respective amounts described in Table 2, and mixed by stirring at 50° C. for 3 hours. The mixture was further deaerated by stirring for 10 minutes to prepare polymerizable composition 1 to polymerizable composition 7 (corresponding to Example 4 to Example 9 and Comparative Example 2). In Table 2, the term "parts" refers to "parts by mass".

[Preparation and Optical Property Evaluation of Cured Product]

Each polymerizable composition was sandwiched, together with a 1 mm thick silicone rubber spacer, between two mold release-treated glass plates. The polymerizable composition thus sandwiched was exposed to UV light at 20 mW/cm$^2$ for 150 seconds. The cured product was peeled from the glass plates and then heated on a hot plate of 150° C. for 20 minutes to prepare a molded article having a diameter of 30 mm and a thickness of 1 mm.

The transmittance at a wavelength of 400 nm, and the refractive index $n_d$ and the Abbe number $v_d$ at a wavelength of 588 nm (d-ray) of the obtained molded article were measured. The results are shown in Table 3.

TABLE 3

| Example/Comparative Example | Polymerizable composition | Transmittance [%] | Refractive index $n_d$ | Abbe number $v_d$ |
|---|---|---|---|---|
| Example 4 | Polymerizable composition 1 | 78.0 | 1.648 | 22.1 |
| Example 5 | Polymerizable composition 2 | 75.8 | 1.654 | 20.7 |
| Example 6 | Polymerizable composition 3 | 71.4 | 1.665 | 20.4 |
| Example 7 | Polymerizable composition 4 | 74.6 | 1.652 | 21.7 |
| Example 8 | Polymerizable composition 5 | 80.9 | 1.656 | 21.0 |
| Example 9 | Polymerizable composition 6 | 74.8 | 1.646 | 22.4 |
| Comparative Example 2 | Polymerizable composition 7 | 8.0 | 1.616 | 26.0 |

As shown in Table 3, the cured products obtained from the polymerizable compositions of the present invention shown in Example 4 to Example 9 were confirmed to have high transparency of 70% or more in terms of transmittance and to exhibit a high refractive index of 1.62 or more and a low Abbe number of 23 or less.

On the other hand, the cured product obtained from the polymerizable composition supplemented with the reactive polysiloxane having no specific structure (Comparative Example 2) had an Abbe number as high as 26.0, which fell short of the performance desirable as lenses having a low Abbe number (e.g., an Abbe number of 23 or less) in lenses for high-resolution camera modules, and was thus confirmed

TABLE 2

| Example/Comparative Example | Polymerizable composition | (a) Reactive polysiloxane | [parts] | (b1) FDA [parts] | (b2) DVB [parts] | (b3) SPeDMS [parts] | Chain transfer agent | [parts] | I184 [parts] | TPO [parts] | I245 [parts] | BHA [parts] |
|---|---|---|---|---|---|---|---|---|---|---|---|---|
| Example 4 | Polymerizable composition 1 | XPe10 | 50 | 30 | 20 | — | DDT | 3 | 1 | 0.7 | — | — |
| Example 5 | Polymerizable composition 2 | XPe10 | 65 | 15 | 20 | — | DDT | 3 | 1 | 0.7 | — | — |
| Example 6 | Polymerizable composition 3 | XPe55 | 52.5 | 17.5 | 17.5 | 12.5 | DDT PTMB | 3 1 | 1 | 0.7 | — | — |
| Example 7 | Polymerizable composition 4 | XPe46 | 50 | 30 | 20 | — | DDT | 3 | 2 | 0.7 | — | — |
| Example 8 | Polymerizable composition 5 | XPe46 | 40 | 25 | 20 | 15 | DDT | 3 | 1 | 0.7 | — | — |
| Example 9 | Polymerizable composition 6 | XPe10 | 50 | 20 | 20 | 10 | DDT PTMB | 3 10 | 1 | 1 | 3 | 0.3 |
| Comparative Example 2 | Polymerizable composition 7 | PPe10 | 50 | 30 | 20 | — | DDT | 3 | 1 | 0.7 | — | — |

Example 10

The polymerizable composition 4 was molded into a lens shape using a nickel mold (18 lens forms of 2 mm in diameter×300 μm in depth arranged in 3 files and 6 rows) and using a nano imprinter on a glass plate as a support. The mold used was mold release-treated in advance with Novec® 1720 [manufactured by 3M]. The glass plate used was adhesion-treated in advance with Shin-Etsu Silicone® KBM-503 [manufactured by Shin-Etsu Chemical Co., Ltd.]. After removal of the mold, the resultant was heated in an oven of 180° C. for 20 minutes to prepare a convex lens on the glass plate.

The lens height (thickness) before and after a heating test was measured as to the obtained convex lens on the glass plate using a non-contact surface property measurement apparatus. The dimensional stability against heating was evaluated from the rate of change therebetween (=(Lens height before heating−Lens height after heating)/Lens height before heating×100). Also, the presence or absence of cracks occurring in the lens after the heating test was observed with a microscope attached to the non-contact surface property measurement apparatus. For the heating test, the obtained convex lens was heated, together with the glass plate, on a hot plate of 165° C. for 30 minutes and then allowed to cool to room temperature (approximately 23° C.). The results are shown in Table 4.

TABLE 4

| Example/ Comparative Example | Polymerizable composition | Crack after heating | Lens height [μm] Before heating | Lens height [μm] After heating | Rate of change [%] |
|---|---|---|---|---|---|
| Example 10 | Polymerizable composition 4 | Absent | 293.3 | 293.2 | 0.05 |

As shown in Table 4, the cured product (convex lens) obtained from the polymerizable composition of the present invention (Example 10) resulted in small change in lens height and high dimensional stability even after heat history of 165° C. for 30 minutes.

The invention claimed is:

1. A polymerizable composition comprising 100 parts by mass of (a) a reactive polysiloxane being a polycondensation product of an alkoxy silicon compound comprising at least an alkoxy silicon compound A of formula [1], and 10 to 500 parts by mass of (b) a polymerizable compound having at least one polymerizable double bond:

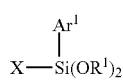

[1]

(wherein X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^1$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^1$ is methyl group, ethyl group, or isopropyl group), wherein a cured product obtained from the composition has an Abbe number of 23 or less.

2. The polymerizable composition according to claim 1, wherein the X is vinylphenyl group.

3. The polymerizable composition according to claim 1, wherein the $Ar^1$ is a condensed ring hydrocarbon group having two or more benzene ring structures.

4. The polymerizable composition according to claim 3, wherein the $Ar^1$ is phenanthryl group.

5. The polymerizable composition according to claim 1, wherein the alkoxy silicon compound further comprises alkoxy silicon compound B of formula [2]:

[2]

(wherein $Ar^2$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^2$ is methyl group, ethyl group, or isopropyl group).

6. The polymerizable composition according to claim 5, wherein the $Ar^2$ is phenanthryl group.

7. The polymerizable composition according to claim 1, wherein the polymerizable compound (b) comprises a fluorene compound (b1) of formula [3]:

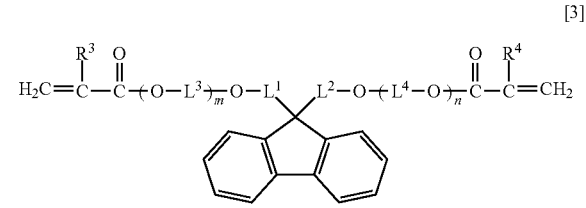

[3]

(wherein $R^3$ and $R^4$ are each independently a hydrogen atom or methyl group, $L^1$ and $L^2$ are each independently a phenylene group optionally having a substituent, or a naphthalenediyl group optionally having a substituent, $L^3$ and $L^4$ are each independently a $C_{1-6}$ alkylene group, and m and n are each independently 0 or a positive integer that satisfies 0≤m+n≤40).

8. The polymerizable composition according to claim 1, wherein the polymerizable compound (b) comprises an aromatic vinyl compound (b2) of formula [4]:

[4]

(wherein q is an integer of 1 to 3, when q is 1, $L^5$ is a hydrogen atom, a $C_{1-20}$ monovalent aliphatic hydrocarbon residue optionally substituted with phenyl group, or a $C_{1-20}$ monovalent aliphatic hydrocarbon residue optionally containing an ether bond, when q is 2, $L^5$ is a single bond, an oxygen atom, a $C_{1-20}$ divalent aliphatic hydrocarbon residue optionally substituted with phenyl group, or a $C_{1-20}$ divalent aliphatic hydrocarbon residue optionally containing an ether bond, when q is 3, $L^5$ is a $C_{1-20}$ trivalent aliphatic hydrocarbon residue optionally substituted with phenyl group, or a $C_{1-20}$ trivalent aliphatic hydrocarbon residue optionally containing an ether bond, $R^5$ is a hydrogen atom or methyl group, $Ar^a$ is a p+1-valent aromatic hydrocarbon residue, and each p is independently 1 or 2).

9. The polymerizable composition according to claim 1, wherein the polymerizable compound (b) comprises a polymerizable alkoxy silicon compound (b3) of formula [5]:

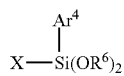

[5]

(wherein X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^4$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^6$ is methyl group, ethyl group, or isopropyl group).

10. A cured product of the polymerizable composition according to claim 1.

11. A material for resin lenses having a high refractive index of 1.62 or more, the material comprising the polymerizable composition according to claim 1.

12. A resin lens prepared from the polymerizable composition according to claim 1.

13. A process for producing a molded article, comprising: a step of introducing a polymerizable composition into space between a support and a mold in contact with each other, or internal space of a separable mold; and a step of photopolymerizing the introduced composition by light exposure, wherein
the polymerizable composition comprises 100 parts by mass of (a) a reactive polysiloxane being a polycondensation product of an alkoxy silicon compound comprising at least an alkoxy silicon compound A of formula [1], and 10 to 500 parts by mass of (b) a polymerizable compound having at least one polymerizable double bond:

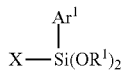

[1]

(wherein X is a phenyl group having at least one substituent having a polymerizable double bond, a naphthyl group having at least one substituent having a polymerizable double bond, a biphenyl group having a least one substituent having a polymerizable double bond, or a phenanthryl group having at least one substituent having a polymerizable double bond, $Ar^1$ is a condensed ring hydrocarbon group having two or more benzene ring structures (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^1$ is methyl group, ethyl group, or isopropyl group).

14. The production process according to claim 13, further comprising: a step of taking the obtained photopolymer out of the space filled therewith for mold release; and a step of heating the photopolymer before, during, or after the mold release.

15. The production process according to claim 13, wherein the molded article is a lens for a camera module.

* * * * *